Dec. 22, 1931.  B. OBER ET AL  1,837,329
PROCESS FOR MANUFACTURING ACID PHOSPHATE
Filed March 3, 1927  2 Sheets-Sheet 1
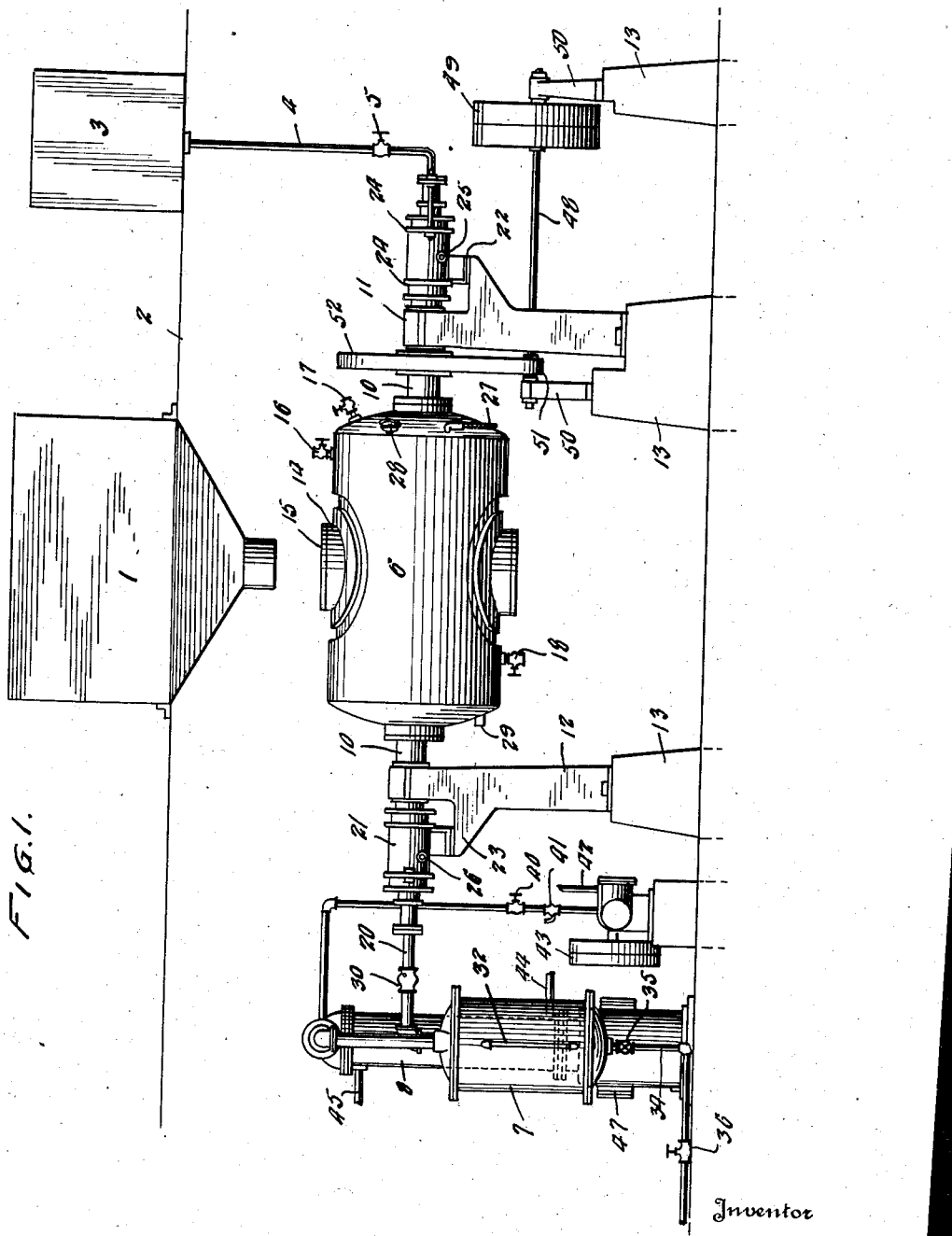
Inventor
BEVERLEY OBER
and EDWARD H. WIGHT
By
Attorneys Dec. 22, 1931.   B. OBER ET AL   1,837,329
PROCESS FOR MANUFACTURING ACID PHOSPHATE
Filed March 3, 1927   2 Sheets-Sheet 2
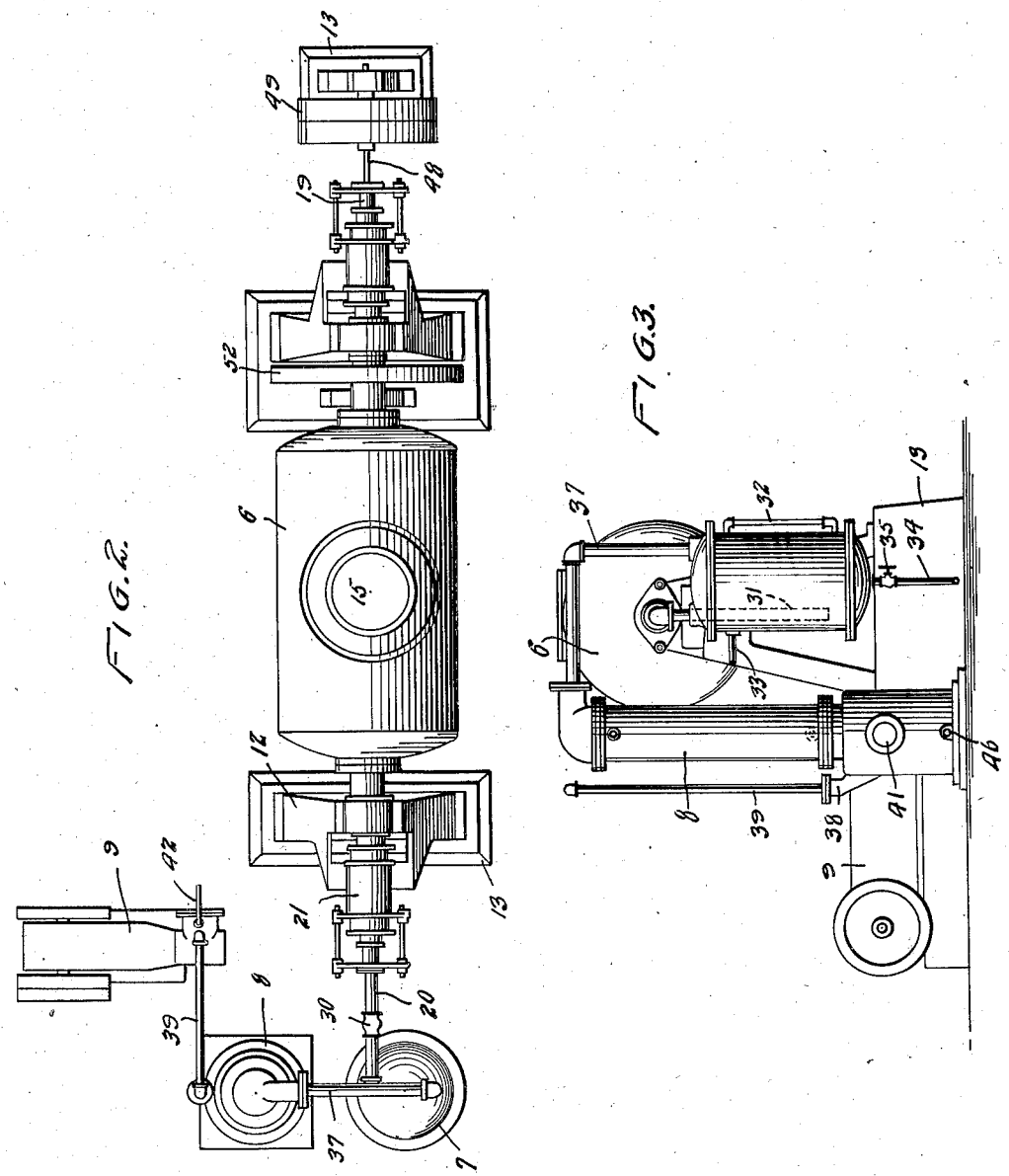
Inventor
BEVERLEY OBER
and EDWARD H. WIGHT
Attorneys Patented Dec. 22, 1931

1,837,329

UNITED STATES PATENT OFFICE

BEVERLY OBER AND EDWARD HYATT WIGHT, OF BALTIMORE, MARYLAND, ASSIGNORS, BY MESNE ASSIGNMENTS, TO THE OBERPHOS COMPANY, OF BALTIMORE, MARYLAND, A CORPORATION OF MARYLAND

PROCESS FOR MANUFACTURING ACID PHOSPHATE

Application filed March 3, 1927. Serial No. 172,359.

This invention relates to a process and apparatus for manufacturing acid phosphate.

In producing acid phosphate prior to this time, predetermined amounts of phosphate rock dust and sulphuric acid have been mixed in a container of capacity varying from one to two and one half tons. This container, or mixing chamber, was provided with an agitator or stirring mechanism usually of the rotary plow type. After a short mixing period the resulting mass was dumped in a large den, each den taking upwards to fifty charges from the container. The acid phosphate was allowed to remain in this den for approximately twenty-four hours after which it was removed to the curing shed. The mass resulting from the mixture of acid rock was admitted into the den as a heavy sludge. In the den it solidifies in a spongy porous mass. This mass is quite moist and as a result difficult to handle.

To accelerate the drying of this mass various expedients have been tried. A common practice was to dust the mass with phosphate rock dust and other dryers. Another method is to frequently turn product over to allow aeration and thus facilitate evaporation of the water content.

After the phosphate was cured it was ground or remilled before being packed. Such processes which involved re-handling of the product demanded considerable expenditure of time and labor, and by reason of the long curing period necessitated large plant investments for dens, curing sheds and the like.

It is the primary object of our invention to devise a method for manufacturing acid phosphate which can be effected in a much shorter time than could be done heretofore.

Another object is to provide a simple apparatus in which the several stages of acid phosphate manufacture may be carried out.

A further object is to devise an apparatus of this character which obviates the use of large dens and curing equipment.

Yet another object is to devise a process, the separate steps of which may be carried out in a single container.

With these and other equally important objects in view, the invention comprehends the treatment of phosphatic material with an acid under regulated conditions of temperature and pressure in an improved apparatus and to effectively carry out therein the several stages of acid phosphate manufacture.

To enable an easy comprehension of the invention there is shown in the accompanying drawings a preferred type of apparatus in which the process may be carried out. In these drawings the same reference numerals refer to similar parts throughout the several views, of which:

Figure 1 is an elevation of an acid phosphate unit;

Fig. 2 is a plan view of the apparatus shown in Fig. 1;

Fig. 3 is an end elevation of the device.

In Figure 1 there is shown a complete unit adapted to produce acid phosphate according to this invention. This comprises a dust hopper 1 mounted on a floor 2 or any other similar support. This hopper may be made of any suitable material such as heavy sheet steel. It is to be understood that this is a weighing hopper and may be provided with a small scale beam pivoted to the hopper at one end and intermediately to support brackets, or it may be of the two point suspension type connected to the scale through triple compound levers. For convenience a small hopper is shown but it will be understood that any preferred type of weighing hopper may be employed. It will be understood further that the phosphate dust may be discharged from the hopper under gravity feed or it may be forced therefrom by any other means. Mounted above the floor line 2 adjacent the hopper is an acid tank 3. This may be of any desired structure and should be lined with an acid resistant material such as regulus alloy. Leading from the tank 3 is an acid line 4 in which is interposed a straight way valve 5.

Positioned below the hopper and acid tank, is the manufacturing unit. This includes a horizontal rotary autoclave 6 which is in fluid connection with a neutralizer 7, a condenser 8 and a vacuum pump 9.

The autoclave is formed with interior and exterior shells to present an intermediate jacket for the reception of heating or cooling media in a manner to be more particularly described. The autoclave is provided with hollow shaft extensions or trunnions 10 which are journaled in the collars 11 of supporting A forms 12. It will be understood that the shaft 10 rotates on bearings mounted in raceways carried by the collars. As shown, these forms are secured to the foundation blocks 13 embedded in the floor or ground.

The autoclave is provided with diametrically positioned manholes 14 which are adapted to be sealed by suitable closures 15. Although a single manhole would suffice, we prefer to use an autoclave having the double opening in order that the autoclave may be more quickly brought into loading position beneath the hopper. The interior and exterior shells of the autoclave are adapted to receive a blow off vent valve 16. On the interior of the container a suitable screen is positioned over the intake of the valve 16 to prevent clogging of the vent port. A valve 17 is mounted on a conoidal end of the autoclave and connects with the jacket to serve as an air break.

Set in the outer cylindrical shell and opening into the jacket is a drain valve 18 adapted to withdraw fluid therefrom in a manner to be more particularly described. The exterior hollow shaft 10, which is in fluid connection with the jacket of the autoclave, encloses a second and smaller hollow shaft 19 which connects with the interior of the container at each end of the latter. The ends of the hollow pipes 19 connect with an acid pipe 4 and a fluid draw-off line 20. The shafts 10 and 19 are received in a cylindrical collar 21 suitably supported by brackets 22 on a threaded extension 23 of the A form. The collar 21 is provided with terminal flanges 24. The exterior flange is apertured to receive draw bolts adapted to maintain a fluid tight connection between the pipes 4 and 20 and the rotating shaft 19.

It will be understood that the shaft 10 is suitably gasketed so as to insure a fluid tight seal with the collar 21. The collar 21, positioned adjacent the acid line 4, is tapped at 25 to receive a condensed water outlet pipe. Similarly, the collar 21 adjacent the draw-off line 20, is apertured at 26 to receive a fluid inlet pipe so that a fluid circuit may be set up in these elements and the jacket of the autoclave, for the purposes of heating and cooling the latter.

Secured to any convenient portion of the autoclave and communicating with the interior are the thermometer 27 and pressure gauge 28. These may be of any standard type and are adapted to register the temperature and pressure conditions within the container. At 29 there is shown diagrammatically a test draw off. This may be fitted with a one way valve. When it is desired to test the material within the autoclave at any stage in the operation the valve may be opened and a small quantity withdrawn. The rotation of the autoclave may be momentarily arrested for this purpose.

As indicated previously, the autoclave is connected to the neutralizer 7. The fluid line 20 has interposed therein a valve 30 adapted to open and close connection between the neutralizer and the autoclave. The pipe 20 is fitted with an elbow to the other end of which is secured a short pipe section 31 which terminates adjacent the bottom of the neutralizing tank. The tank is fitted with a gauge glass 32 to show the height of the neutralizing liquid in tank 7. Connected to the upper portion of the tank is a liquid feed line 33 through which fresh neutralizing stock is introduced. The flow of liquid through this intake line may be controlled by suitable valves (not shown). To the bottom of the tank there is connected a draw-off line 34 controlled by cocks 35 and 36. Leading from the top of the neutralizing tank is a vapor draw-off line 37 which, at its other end, is directly connected to the upper part of the condenser column 8.

The vapor line 37 is in fluid connection with the suction line 38—39. As shown, particularly in Fig. 2, the suction line 39 leads to the vacuum pump 9. Interposed in the line 39 is a regulating valve 40 and a lubricating port 41. The fluid drawn in through the line 39 is ejected from the pump through the discharge line 42.

The vacuum pump 9, which may be of any desired construction, is provided with a driving pulley 43 which, on being rotated by any driving means, is adapted to impart reciprocating motion to the pump piston, to draw fluid in through the line 39 and discharge it through the line 42.

Tapped in the lower end of the condensing column is a cold water inlet 44. The cooling medium, such for instance as cold water, flows in continuously through this line and is withdrawn from the upper end of the column through the line 45. It is to be noted that the vapors flow down through the condenser countercurrent to the upward flow of the cooling medium. The condensate formed in the column is withdrawn from the bottom through the draw-off line 46 (Fig. 3) while incondensable gases are drawn through the suction line 39. Positioned in the lower portion of the condenser are the sight glasses 47 through which the quantity of condensate being withdrawn may be observed.

As intimated hereinbefore, the autoclave is adapted to be rotated during the treatment of the rock. This is accomplished by connecting the autoclave to a driving mechanism. As shown, particularly in Fig. 1, this comprises a driving shaft 48 suitably connected near one end through the pulley 49 to a source of power and adjacent the other to transmission gearing and the autoclave. This shaft is journaled adjacent its ends in bearings carried by the support brackets 50. These brackets are fixed to the foundation blocks 13 in any desired manner. The driving pulley 49 is keyed to the shaft and is adapted to receive motion from the motor through the intermediacy of a belt or the like. At the other end of the shaft, adjacent the bracket, there is keyed or otherwise fixed, a driving gear 51. This gear meshes with driven gear 52 which is fixed to the shaft 10 of the autoclave. It will be understood that while there is shown a simple driving mechanism any other type of motion transmission means may be employed.

The operation of the device will be perceived from the foregoing description. Phosphate rock, ground in a crusher to any suitable degree of fineness, is admitted to the hopper and weighed therein. The manhole cover 15 is removed and this measured amount of dust allowed to feed by gravity into the subjacent autoclave. As has been explained previously, the dust may be forced in under pressure. The cover is then replaced and tightly bolted to insure a hermetic sealing. The motor is then started and the autoclave rotated. Valve 5 is now open and a predetermined amount of acid, such as sulphuric acid, is admitted under gravity or pump pressure. By pouring in the acid under pressure and concomitantly rotating the autoclave, an intimate initial mixture of the reactive ingredients is insured. It is to be understood that the acid line may project into the autoclave and be bent to extend parallel with the cylindrical portion of the latter. The lower portion of the acid pipe is perforated so that the acid is, in effect, sprayed down upon the rock. Any other suitable spraying mechanism may be employed. As the acid line enters the autoclave it is slightly offset so that it will be clear of the space beneath the manhole when the autoclave is in loading position. The amount of acid may be slightly in excess of the theoretical quantity necessary to react with all of the dust. It is to be noted that a sufficient amount of water should be present to insure proper crystallization of the acid phosphate.

During the reaction period the autoclave is rotated continuously. As the acid reacts with the rock a considerable quantity of heat is generated and gaseous reaction products are evolved. By retaining the reacting mass in an air tight container relative percentages of the reacting components are maintained and the reaction is carried out at elevated temperatures. In carrying out the process as described, the mass may be maintained in a sludgy condition for a prolonged period of time. This physical condition of the material tends to insure intimate contact of the reactive acid and rock components. This is an important feature of the process and differs radically from the conventional process of mixing in a pan wherein the mass sets up or becomes hard in a very short time. Hence the desirable fine distribution of the rock in a liquid medium could not be obtained. By this process on the other hand, the mass is maintained in the liquid or semi-liquid state until all of the rock has become mixed.

The digestion of the rock in the rotating container is continued until the reaction is complete. The time required for this will of course vary depending on such factors as the imposed pressures, the intimacy of the mix, the temperature of reaction and so forth. The transition from the mixing to the converting stage may be accomplished by increasing the temperature or decreasing the pressure, or by a combination of both factors. Under ordinary conditions from twenty minutes to an hour is a sufficient period to allow a complete conversion of the phosphatic material.

After the rock and acid have reacted completely the valve 16 is opened and the generated gaseous products are allowed to escape. If desired, at this point the autoclave may be stopped and the valve 16 coupled to a receiving tank containing an absorbing medium for the gases. After the gases have been evacuated and the pressure in the autoclave reduced to atmospheric pressure, the valve 16 is closed. The vacuum pump 9 is then set in operation and the valves 40 and 30 are opened. Upon operation of the pump a suction is set up in the lines 39 and 37 and the residual gases are withdrawn from the autoclave. These gases course through the pipes 20 and 31 and percolate through the lime or equivalent neutralizing solution in tank 7. During the passage through the neutralizing solution, most of these gases are absorbed in the solution and some substances, such for instance as calcium sulphate, are precipitated out. If desired, the liquid in the tank 7 may be continuously withdrawn through the pipe 34 while fresh stock is admitted through the pipe 33.

From the neutralizing tank the residual gaseous stream is sucked through the line 37 and downwardly through the condenser countercurrent to the stream of cooling medium, in the manner already described. From the condenser the gases incondensable at the temperature obtaining therein are drawn through the line 39 and discharged through the line 37.

It will be appreciated that instead of initially blowing off the larger portion of gas through the valve 16 the entire volume of vapor in the autoclave may be withdrawn through the pipes 20 and 28 to flow through the neutralizing tank and condenser in the manner stated. It will be observed that during the process the reacting mass is subjected to an autogenous pressure. This pressure is built up by the evolution of the gas products of reaction, such for instance as carbon dioxide and hydrogen fluoride. In some cases, particularly when the raw material has a very high carbonate content, the pressure increases to such a degree as to retard the reaction beyond the desired point. When such an excessive pressure is registered on the pressure gauge it may be reduced by slightly releasing the valve 16. It is to be noted that this operation may be rendered automatic by placing an automatic release valve, set to any desired pressure, on the autoclave. Throughout this operation the temperature obtaining in the autoclave will register on the thermometer.

While the reaction between the rock and acid generates considerable heat we have found that the action could be further accelerated by applying external heat. The process in which this external heat is utilized is similar to that previously described. After the comminuted rock has been admitted to the autoclave the cover is bolted in sealed position. The valve 17 is then opened slightly and a heating medium, such as steam, admitted to the hollow shell through the line 26. The incoming steam forces air out through the valve 17 which may be closed when the space between the interior and exterior shells is filled with steam. The superheated steam then circulates through the autoclave and out through the discharge line 25. The temperature may be controlled by regulating the flow of the heating medium through suitable valves placed in the steam inlet line.

As explained in our pending application, Ser. No. 112,678, filed May 29, 1926, we find that that the reactions occurring in the autoclave may be further accelerated by submitting the ground rock to a preliminary vacuum. This serves to evacuate air from the autoclave and rock and to draw off the occluded moisture in the rock, and insures the subsequent rapid penetration of the rock by the acid.

This process may be readily carried out in the described apparatus. To do this, rock dust is admitted to container and sealed therein. The valve 40 is then opened and the vacuum pump set in operation. It will be understood that during this time the valve 5 is closed. The autoclave is then rotated while the vapors in the autoclave are drawn out through the line 20. To facilitate the removal of the moisture in the rock, steam may be circulated through the autoclave jacket during a portion of the evacuating period.

After the autoclave has been under a vacuum for the desired period the pump is stopped, the valve 40 closed and the valve 5 opened. The vacuum within the container, acting as a reverse pressure, draws in the acid with great rapidity and sprays it over the rock. The continuous rotation of the autoclave during this period insures an intimate mixing in the manner described.

After the rock has been treated with the acid for the desired period, the pressure is released in the manner described. This quick drop in pressure is accompanied by a rapid decrease in temperature which initiates crystallization of the mass. This crystallization can be hastened and the drying of the product can be accelerated by submitting the mass to a second vacuum. This may be done by opening the valve 30 and starting the pump of the vacuum motor. The suction set up in the line 20 drains the gases and water vapors from the autoclave. This drop in pressure, occasioned by the vacuum pump, causes a second drop in temperature which aids in completing the crystallization of the products.

The time required for the complete process may be additionally shortened by admitting an extraneous cooling medium to the autoclave jacket during this crystallization and drying period. This may be accomplished by connecting the fluid inlet line, through suitable valve and pipe connections to a source of cooling medium, such for instance as a brine solution. The brine passing through the jacket abstracts heat from the mass in the autoclave and accentuates the cooling effect of the pressure drop. The quick drop in temperature resulting from these two causes, assures a rapid and complete crystallization of the product.

After this final treatment in the autoclave, the product comprises a number of relatively small nodules of dry, fine grained acid phosphate. It is removed from the autoclave by opening the lower manhole and allowing the mass to deposit in a car or endless belt. It is then transported to the grinding machine where it is ground to the desired size and bagged.

It will be seen that we have provided an apparatus which is well adapted to carry out the several processes described. By using this apparatus we are enabled to conduct practically the entire treatment of phosphate rock in a single container. As pointed out hereinbefore, the rock may be deaerated, intimately mixed with acid, converted, crystallized and dried in a single autoclave. By connecting a vacuum pump to the autoclave and providing the latter with a jacket, we are enabled to exercise any desired regulation of the temperature and pressure conditions of the process. It is to be noted particularly that we have eliminated entirely the conventional apparatus of the prior art. Our process involves no separate mixing machine, large dens and extensive curing sheds. The apparatus is carefully devised so as to be operated by one workman; the entire unit being housed within a very small compass.

It will be appreciated that any desired number of the described units may be set up to form a battery. Each autoclave of the battery may be driven from a single source of power. Similarly each autoclave may be connected to one or more vacuum pumps. The separate units may be operated simultaneously or in any desired number by interposing a suitable clutch mechanism in the motion transmission line and suitable valves in the vacuum line. It will be seen that the apparatus is susceptible of modification in design and construction of the several parts and hence we do not intend to be restricted to the particular apparatus shown, since we conceive the invention to reside broadly in the process set forth and in the mechanical elements adapted to effectuate the process.

We claim:

1. The method of producing acid phosphate comprising heating ground phosphate rock in a sealed container while subjecting the container to a vacuum, admitting an acid into the autoclave and rotating the autoclave to insure thorough mixing of the ingredients.

2. The method of producing acid phosphate comprising mixing ground phosphate rock and an acid in a sealed container, rotating said container retaining the autogenous pressure and temperature of chemical reaction, applying extraneous heat during reaction, suddenly reducing pressure to normal atmospheric value, and then subjecting the product to a vacuum.

3. The method of producing acid phosphate comprising mixing ground phosphate rock and an acid in a sealed rotating container, retaining the autogenous pressure and temperature of chemical reaction, applying extraneous heat during reaction, suddenly reducing pressure to normal atmospheric value, then subjecting the product to a vacuum and reducing its temperature with a cooling medium, thereby accelerating crystallization and drying.

4. The method of producing acid phosphate comprising mixing ground phosphate rock and an acid in a sealed rotating container, retaining the autogenous pressure and temperature of chemical reaction, applying extraneous heat during reaction, suddenly reducing pressure to normal atmospheric value, then subjecting the product to a vacuum and reducing its temperature with a cooling medium, thereby accelerating crystallization and drying, and removing from container and immediately grinding to desired size.

In testimony whereof we affix our signatures.

EDWARD HYATT WIGHT.
BEVERLY OBER.